INVENTOR
JOHN H. WARE, JR.,
BY
ATTORNEY

July 3, 1956 J. H. WARE, JR 2,753,020
METAL WINDOW STRUCTURE
Filed Jan. 26, 1954 7 Sheets-Sheet 2
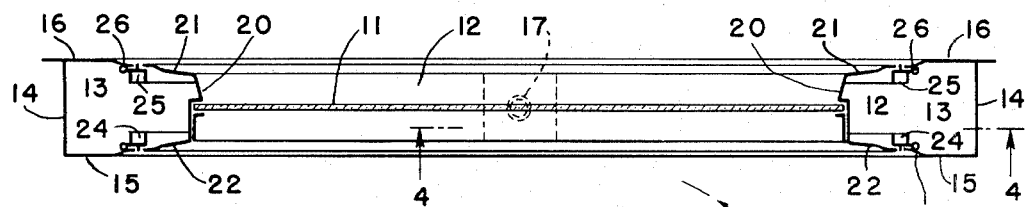
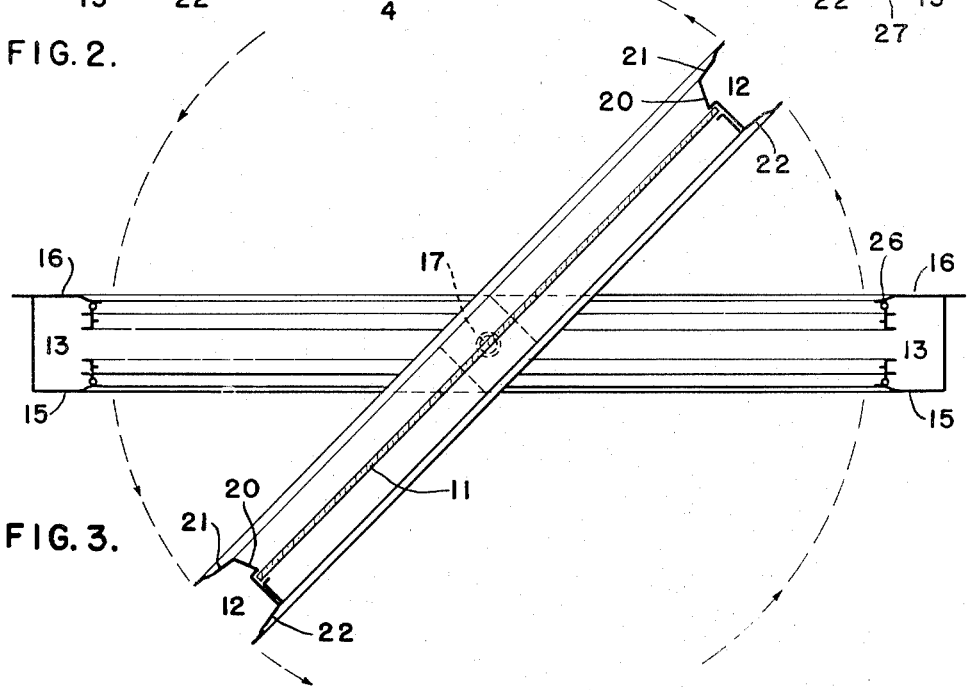
INVENTOR
JOHN H. WARE, JR.,
BY
Arthur Middleton
ATTORNEY

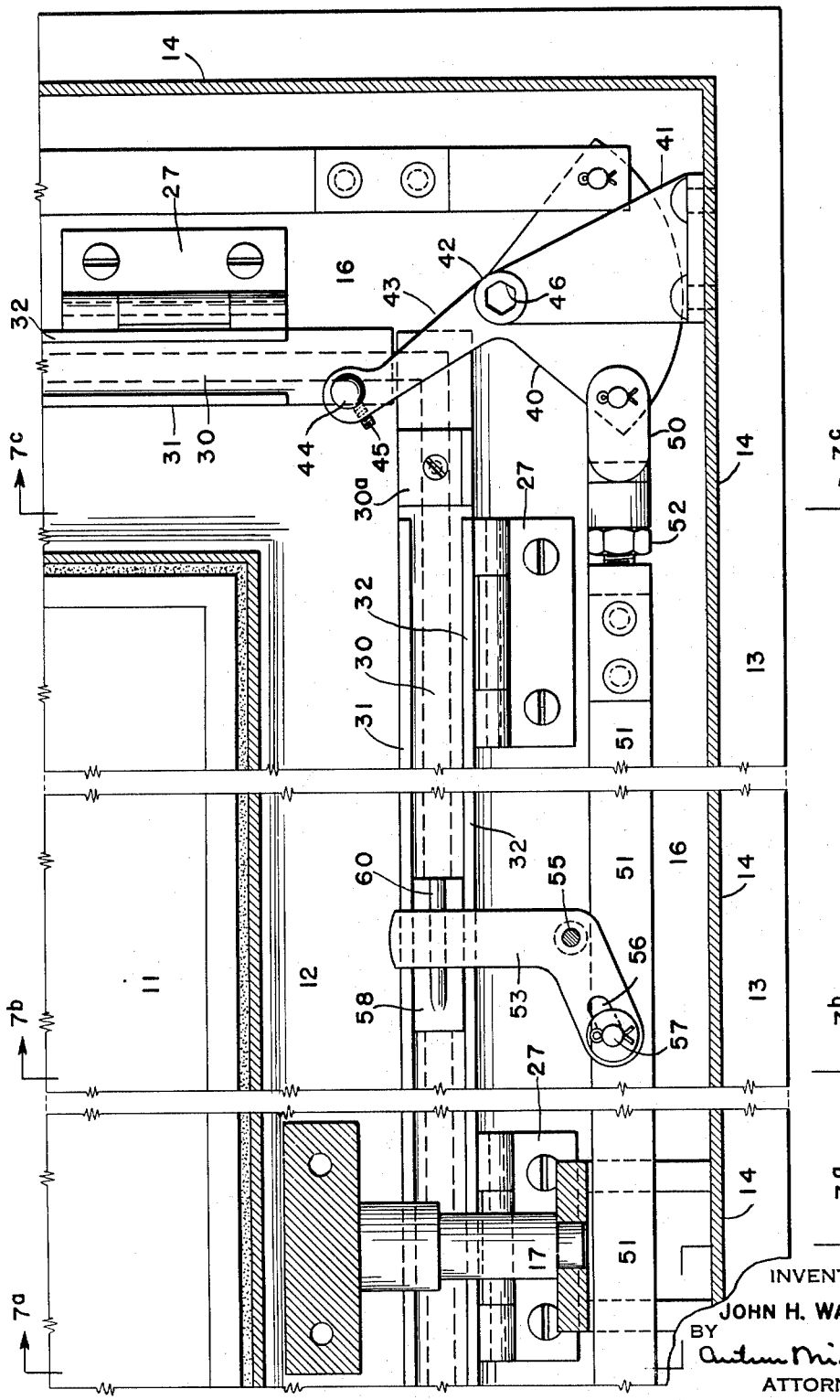

July 3, 1956  J. H. WARE, JR  2,753,020
METAL WINDOW STRUCTURE

Filed Jan. 26, 1954  7 Sheets-Sheet 4

INVENTOR
JOHN H. WARE, JR.,
BY
Arthur Middleton
ATTORNEY

INVENTOR
JOHN H. WARE, JR.,
BY
ATTORNEY

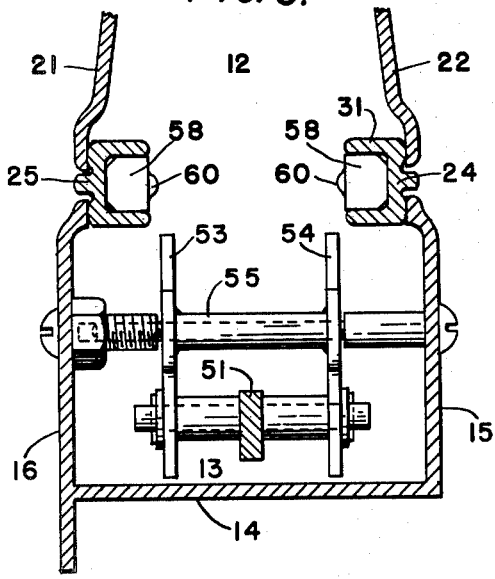
FIG. 8ª
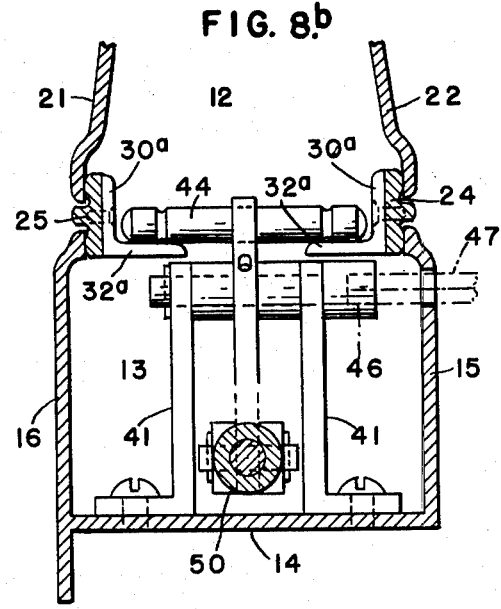
FIG. 8ᵇ
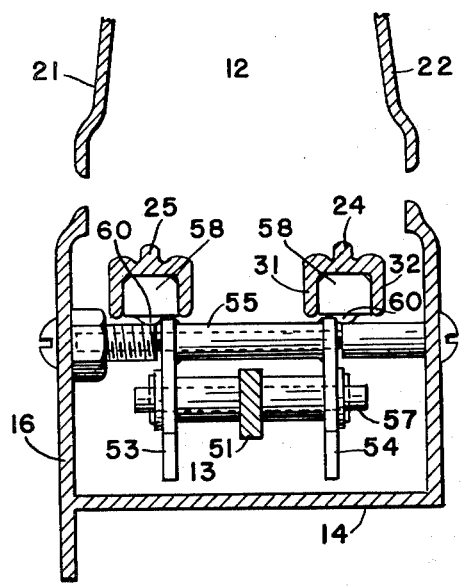
FIG. 9ª.
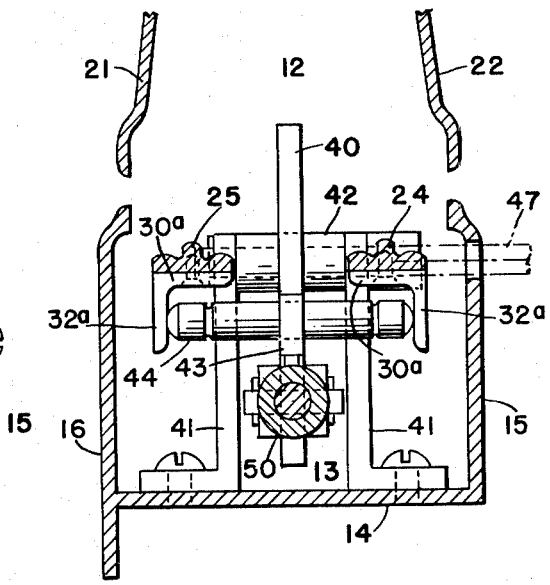
FIG. 9ᵇ.

United States Patent Office 2,753,020
Patented July 3, 1956

2,753,020

METAL WINDOW STRUCTURE

John H. Ware, Jr., Miami Beach, Fla.

Application January 26, 1954, Serial No. 406,184

11 Claims. (Cl. 189—69)

This invention relates to that type of window that has a fixed frame in which a glazed vent-section (or sash) is turnably mounted within the fixed frame so that the vent-section can be rotated from within the room whereby the glass of the vent-section can be cleaned without the window-cleaner having to get out on the window sill. Many attempts have been made to make such a window frame with such a vent-section but none has been so far commercially successful because it has appeared impossible to devise dependable separable fastening between fixed frame and pivoted vent-section. This problem has been found even more difficult to solve when the frame and sash or vent-section are made of aluminum.

So one of the objects of this invention is to devise an extrudable metal frame and vent-section with a dependable separable fastener between the two. Such a fastener must be weather-proof and air-tight, and yet it must not depend for the latter upon gaskets or other weather-proofing. Nothing must be used for this purpose that causes the outside of the window and its vent-section to become stained, streaked or otherwise made unsightly. Since such a window is usable in tall buildings, it must not be subject to whistling as a result of high winds.

So it is another object of this invention to devise such a window combination that is all of metal, and indeed, all aluminum on its exposed surfaces. Another object is to devise such a combination which at least on its exterior meets all architectural requirements, both from the standpoint of practicality and of beauty. Such a window combination has a wide range of uses, but with the growing use of air-conditioning in offices, hotels and other large buildings, it is important that the occupant of a room cannot open the vent-section of the window, so another object of this invention is to devise such a window combination that cannot be so opened, namely, that can be opened solely by the window-cleaner or a representative of the owner of the building.

In such a window combination, the fixed frame and the rotatable sash or vent-section are usually made of metal that is channel-shaped, or more or less U-shaped in cross-section with the free end of the channel or of the legs of the U abutting and aligned when the vent-section is in window-closing position. The vent-section is usually rotatable on a vertical axis through 360°. The separable fastening means must be housed within the space enclosed by the channels so as not to be unsightly, and when the vent-section is in window-closing position, the junction between the abutting free edges of the channels of the frame and the vent-section must not only be bridged but be closed and sealed by that fastener.

Therefore, an embodiment of this invention has linear leaf members hingedly supported from the interior of the frame to be retractably swingable to extend outwardly therebeyond to bridge the junction between the abutting free edges of the frame and of the vent-section when in window-closing position. These leaf members are alternately swung into and out of junction-bridging position. After being swung into junction-bridging position, they are then forced outwardly to exert compression pressure on the sides of the vent-section so that the junction is both closed and sealed. The means for exerting this compression must be retracted before the leaf members can be swung inwardly into the channel of the window frame into non-bridging position whereupon the vent-section can be turned and opened. So this invention is characterized by means for swinging the linear leaf members into junction-bridging position and means for then forcing them into sealing position. In order that the vent-section can be opened, means must be provided for retracting the leaf members from junction-sealing position and means also for retracting the leaf members from their remaining junction-bridging position, whereupon the vent-section can be opened. This sequence seems to be important. This is a rather broad statement of the characteristics of this invention, but details of construction and of functioning of these means are also important. These will be described in more detail hereinafter and in the claims. However, in connection with them, it may be mentioned that the leaf members are both positively moved into junction-bridging position and positively removed from that position. Also the leaf members, after being placed in junction-bridging position, are wedged outwardly into sealing position. And further, the sealing contact between the leaf members and the walls of the vent-section is a line contact or tangential contact rather than face-to-face contact for thus minimizing capillary attraction between the two. And still further, it is possible to devise the means so that they cannot be operated except by a special key.

The best embodiment of my invention now known to me is described herein as an example of the invention, but it is to be taken in an illustrative sense and not a limiting one for obvious changes can be made therein so long as they meet the requirements of the appended claims or their equivalents. The invention is thus illustrated in the accompanying drawings wherein:

Fig. 2 is a cross-section of the frame taken on line 2—2 in Fig. 1 showing the window closed and fastened.

Fig. 3 is a view similar to Fig. 2, although with the window unfastened and open.

Fig. 4 is a greatly enlarged detail section of a corner portion of the frame taken on line 4—4 in Fig. 2 showing a respective portion of the fastening mechanism in its window-fastening end position.

Fig. 8 (forming Figs. 8a and 8b) shows a cross-section of the window frame and of the mechanism taken on lines 8a—8a; 8b—8b, respectively, of Fig. 5.

Figure 6:
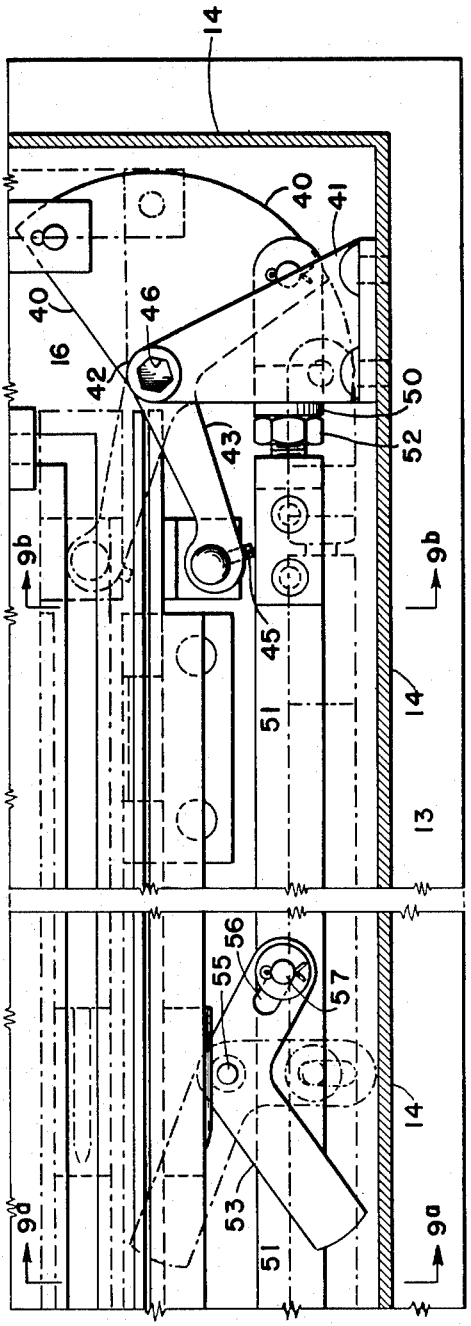
Fig. 6 shows the mechanism similar to Fig. 5, although in its unfastened end position.

Fig. 9 (comprising Figs. 9a and 9b) shows cross-sections of the window frame and mechanism taken on lines 9a—9b and 9b—9b, respectively of Fig. 6.

Figure 7C:
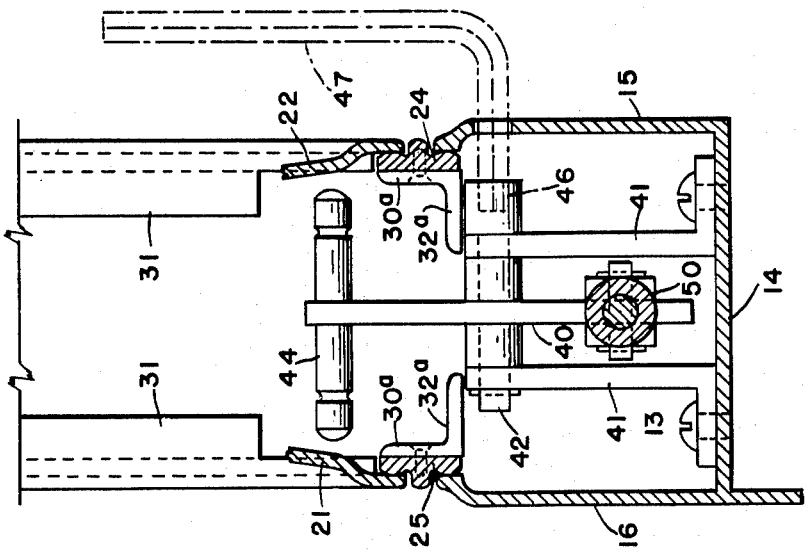
Fig. 7 (comprising Figs. 7a, 7b and 7c) shows cross sections of the window frame and mechanism taken on lines 7a—7a; 7b—7b; 7c—7c, respectively, of Fig. 4.
Figure 7B:
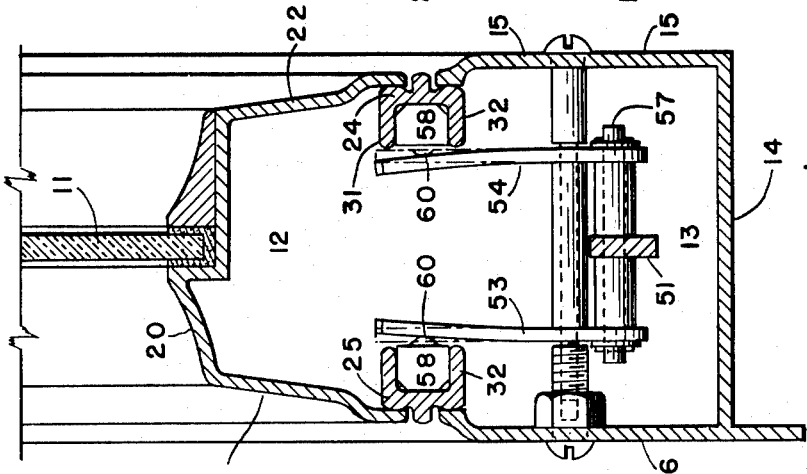
Figure 10:
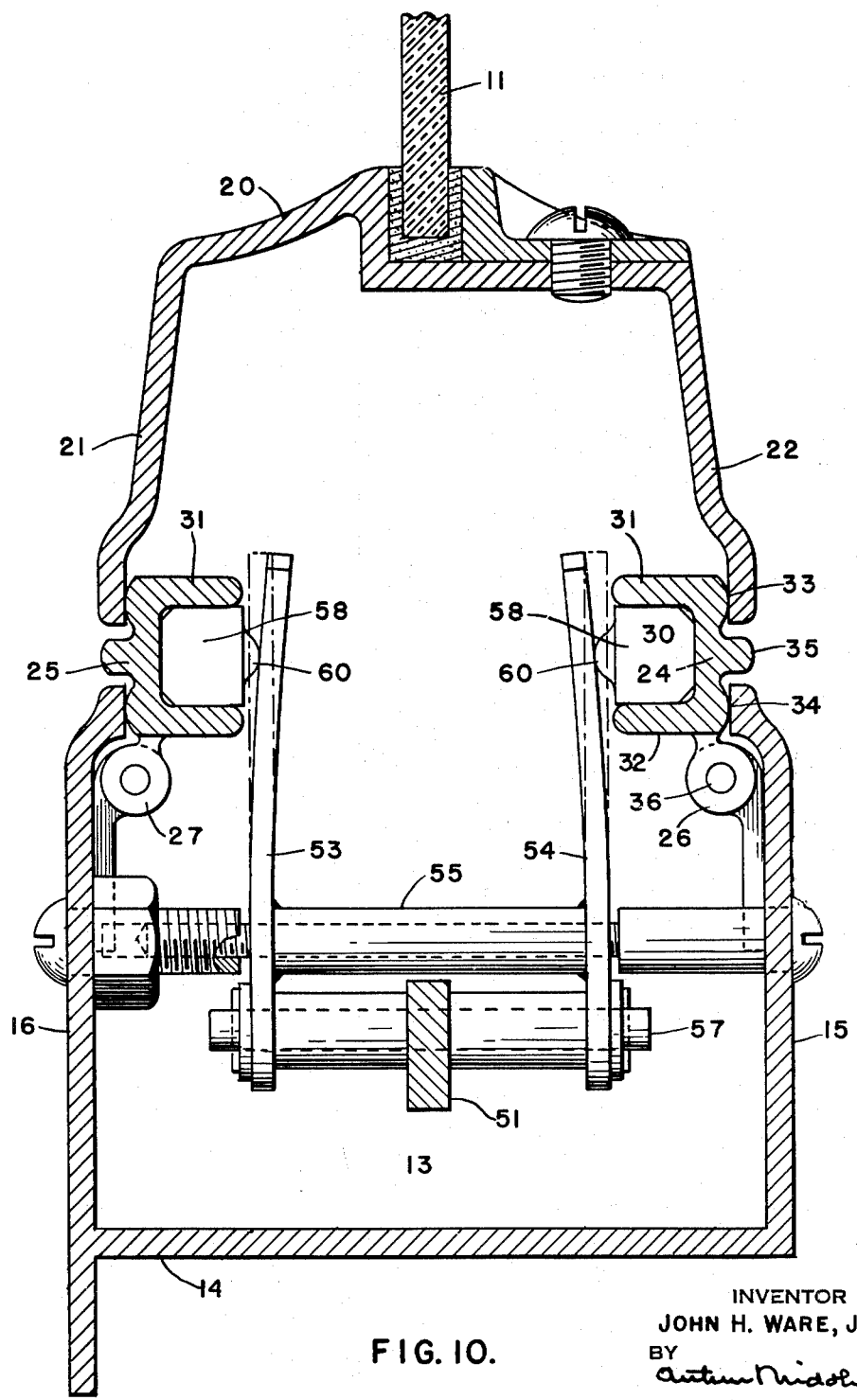

Fig. 10 is a still further enlarged cross-sectional view similar to that of Fig. 7b, although illustrating the manner of resilient deflection of the window fastening latching bell cranks when in closed end position.

In the drawings, the rectangular window glass or glazing 11 is held in the rectangular window vent-section 12, turnably mounted in fixed window frame 13 formed more or less U-shaped in cross-section, that is, channel-shaped and having a base-section 14 with angled sides (or legs of the U) 15 and 16, respectively, presenting free edges. The vent-section in this embodiment is supported on a vertical axis in the fixed frame by pivot pins 17 and rotatable through 360°. The vent-section also is more or less U-shaped in cross-section; that is, channel-shaped, and has a base-section 20 with angled sides (or legs of the U) 21 and 22, respectively, presenting free edges. The free edges of vent-section alignedly abut or face the free edges of the frame when the vent-section is in closed position.

The junction between these abutting edges of the turnable vent-section and the fixed frame must first be bridged and then sealed by retractable separable fastener means housed out of sight within the space provided by either or both of the vent-section and the frame. These means include linear leaf-like members 24 and 25 swingable into and out of junction-bridging position, for example, by being supported from hinges 26 and 27, respectively, carried by the interior of the angled sides of the frame, so that when retracted from non-bridging position, the leaf members are entirely withdrawn clear of the abutting free edges of the frame and vent-section. Fig. 10 shows these in enlarged detail where it can be seen that each leaf member (only member 24 will be now described in detail because member 25 is duplicative of member 24 except opposite in direction) is substantially U-shaped or channelled to present a body portion 30 with reinforcing or stiffening flanges or wings 31 and 32. The exterior of the body 30 is preferably provided with a curved face molding 33 contacting tangentially in a line contact with the side 22 of the vent-section to minimize capillary attraction therebetween, and also provided with a similarly curved face molding 34 for line contact with the side 15 of the fixed frame. Between these moldings 33 and 34 may be provided a rib 35 extending between the abutting free edges of the vent-section and frame, for architectural reasons such as for casting a decorative shadow. The pintle 36 of the hinge 26 is offset from the side 15 of the frame to prevent binding. That is, the axis of the pintle should be in the plane of aligned inner faces of the abutting free edges 22 and 15, respectively, of the vent-section and the frame—or if not exactly in that plane, then inwardly thereof.

Figure 1:
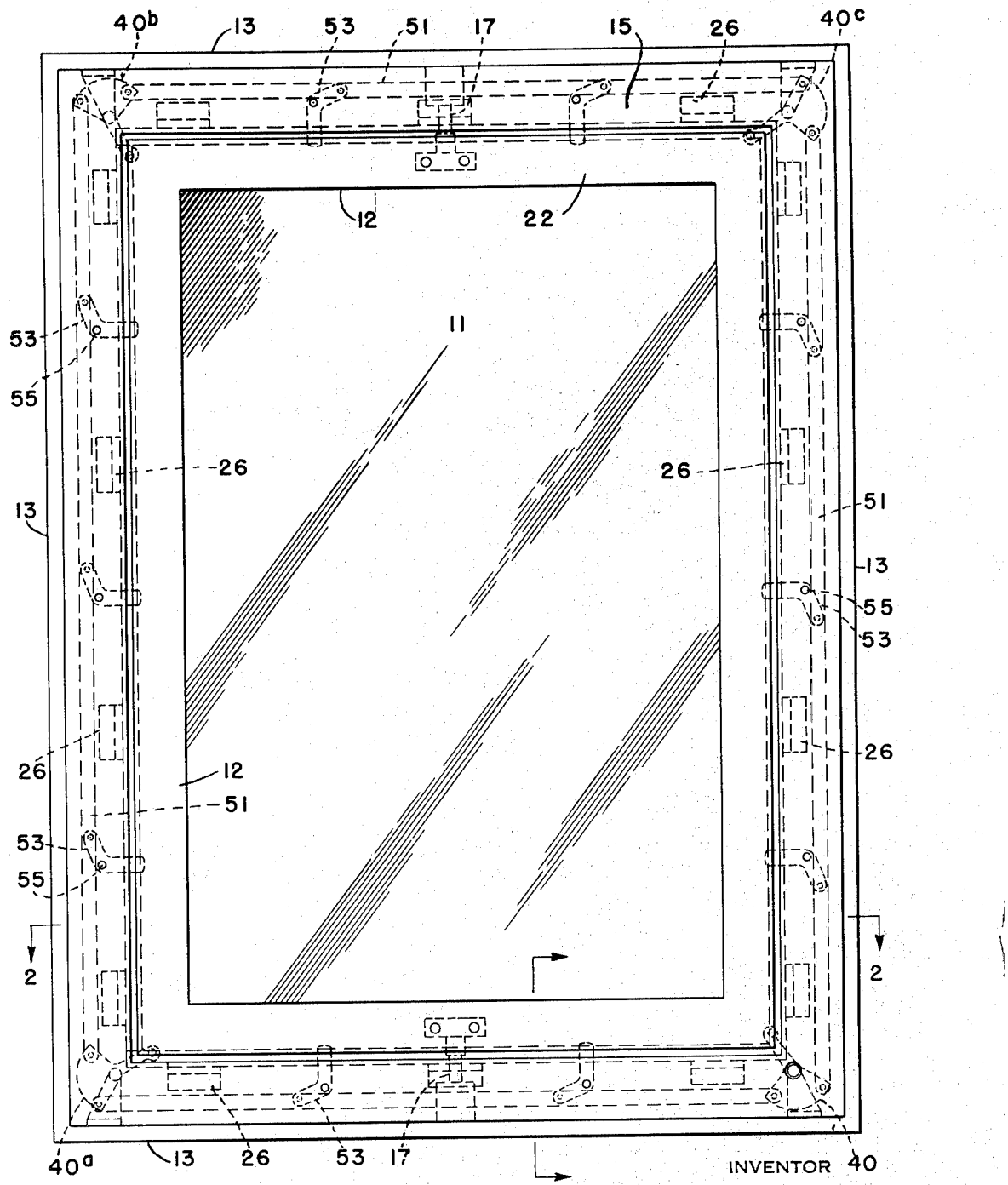
Figure 1 is a schematic front view of the window frame taken from within a room, indicating the window fastening mechanism with retractable inwardly swingable window sealing leaf members, latches for those members, and actuating mechanism for operating the sealing members and the latching levers conjointly.

The leaf members 24 and 25 are swung into and out of junction-bridging position by the following devices: in each corner of the rectangular fixed frame is a pivoted sector-shaped lever or plate, which, for short, will be called a quadrant, all connected together with links, so that when an operator operates one quadrant, as by a key or handle, all the quadrants are similarly turned. Since the functioning of each quadrant is similar, except for the key or handle, only one quadrant assembly will be described at the moment. The quadrant 40 in the lower right-hand corner of Fig. 1 (and illustrated in the sequential figures) is supported by a bracket 41 on the interior of the base 14 of the fixed frame 13. The quadrant is turnably pivoted at 42 and has an arm 43 extending from the quadrant on the other side of the pivot 42. From the free end of the arm extends laterally on both sides thereof a finger (or pin) 44 (held in place by set-screw 45) having rounded or ball-shaped ends. In this particular quadrant, the pivot pin 42 is provided with a socket 46 into which fits a key 47 (or handle) insertible into the fixed frame to be used by the operator of the window (see Fig. 7c).

Referring now to Figs. 4, 5, 6, 8b and 9b, it can be seen that in Fig. 4, the vent-section is in junction-bridging but unsealed position. As the operator inserts the key in socket 46 and turns it counter-clockwise, arm 43 of quadrant 40 descends into its position shown in Figs. 5 and 8b until the pin 44 engages the leaf members 24 and 25 through the medium of the flange 32 (or possibly an extension plate 32ª thereof), whereupon continued downward motion of the pin 44 passes it to the position shown in Figs. 6 and 9b with the result that the leaf members 24 and 25 are swung from junction-bridging position to full withdrawn position and retracted into the channel space in the fixed frame 13. Since the other quadrants are acting concurrently in the same manner, due to links 51 described later, the vent-section is thus left unfastened and accordingly can be turned freely on its vertical axis. Reverse action and movement of the quadrants and their arm-supported pins 44, return the leaf members 24 and 25 to junction-bridging position except that in so returning, the pin 44 engages the body 30 thereof (or possibly an extension plate 30ª thereof).

Linkage means between adjacent quadrants comprises a clevis 50 carried by each quadrant such as 40 and a rod or line 51 (preferably rectangular in cross-section) adjustably secured to the clevis by adjusting nut 52. Thus turning movement of one quadrant causes links 51 to reciprocate, and causes the other quadrants to do likewise. Reciprocation of the links pivotally operates one or more pairs of latching bell-crank levers 53 and 54. Each pair is pivotally mounted on a pin 55 which derives its support from the sides 15 and 16 of the fixed frame. The lower arms of the bell-cranks are slotted as at 56, through which passes a pin 57 that is carried by link 51 so that reciprocation of the link in one direction, that is, to the right, as the quadrant turns clockwise, causes the bell-cranks to move clockwise from their position shown in Fig. 6 to that of Fig. 5, and then to that of Fig. 4 (also Fig. 7b). When in the position of Figs. 4 and 7b, the upper arms of the bell-cranks engage blocks 58 appropriately fitted between the flanges of leaf member 24, and 59 of leaf member 25, respectively, but with each block presenting a projecting lateral rib 60 which imposes a wedging action on the upper arms of the springy bell-cranks as they engage the wedging ribs. This causes those upper arms to be flexed inwardly as shown in Fig. 10, which exerts important closing and sealing compressive pressure on the leaf members after they are in junction-bridging position against the aligned abutting edges of the vent-section and the frame.

The proper sequence of first swinging the leaf members 24 and 25 into junction-bridging position, such as in Figs. 8ª and 8b, followed by being pressed or wedged into their junction-sealing position, as in Figs. 4 and 7b, is controlled as to timing by the length and possibly the angle of the arm 43 on its quadrant. Then in reverse order, the bell-cranks are unlatched from sealing position (Figs. 4 and 7b), whereupon the leaf members are swung from junction-bridging position (Fig. 8b) to retracted position (Fig. 9b) due, as before, to the length of throw of the arm 43 on the quadrant. Since the quadrants are duplicated in the other corners of the fixed frame, they have merely been numbered 40ª, 40b and 40c, respectively, but connecting links 53 and co-acting bell-crank latches are only numbered the same, without exponents.

A pair of screws 18 and 19 indicate that the vent-section sides 21 and 22 are disconnectible from crosshead on the pivot-pin 17 for assembly and disassembly purposes.

Figure 5:
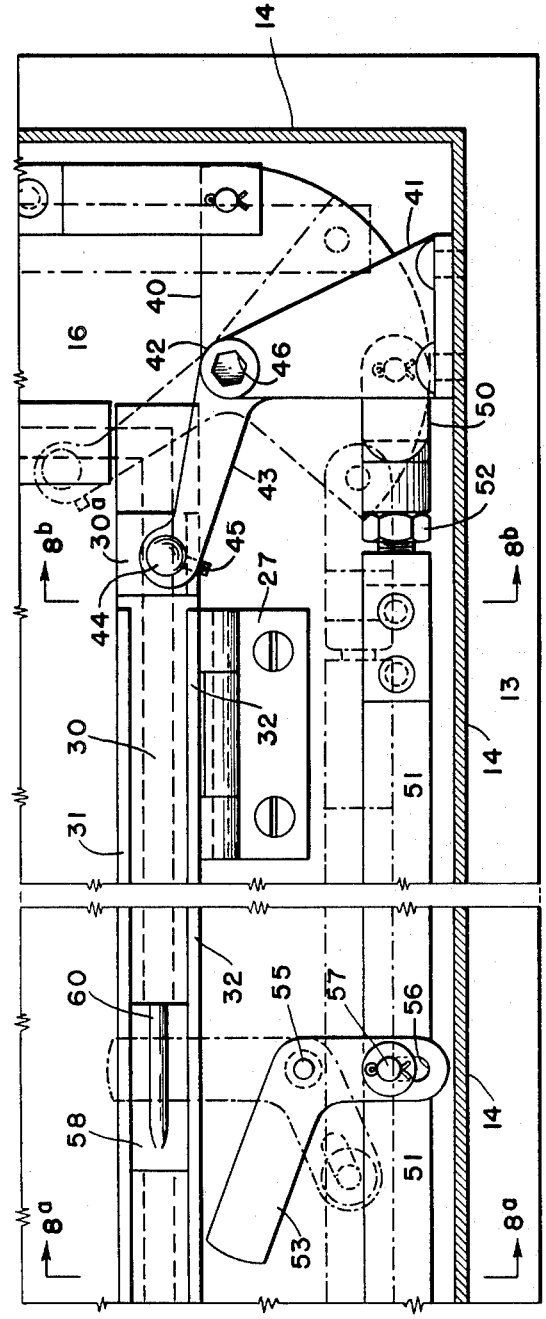
Fig. 5 shows the mechanism similar to Fig. 4 although in an unfastened intermediate operating position.

In operation, then, the operator upon putting the key 47 in the socket 46 of quadrant 40 and turning it counter-clockwise, first causes the pin 44 of arm 43 to start downwardly from the position shown in full lines in Figs. 4 and 7c, with the first sequential result being that as link 51 is moved toward the right in Fig. 4, the latching bell-cranks 53 and 54 are turned counter-clockwise until they are freed from all contact (and thus outward sealing pressure) on the blocks 58 carried by the leaf members 24 and 25, namely, to a position shown in Figs. 5 and 8ª. This, however, leaves the leaf members yet in junction-bridging (but not sealing) position. Further turning downwardly of the quadrant 40 and its arm 43 to position Fig. 8b, brings the pin 44 into contact with the leaf members 24 and 25. Still further descent of the arm 43 to position Fig. 6, due to pin 44 pressing downwardly on flanges 32 (or their extension 32ᵃ) causes those leaf members to swing downwardly about the pivots 36 of their hinges so they and their associated parts all are retracted or depressed as shown in Figs. 6 and 9ᵇ, whereupon the operator can turn the vent-section about its vertical axis since all parts of the separable fastening means between vent-section and the fixed frame are separated free and clear.

Figure 7A:
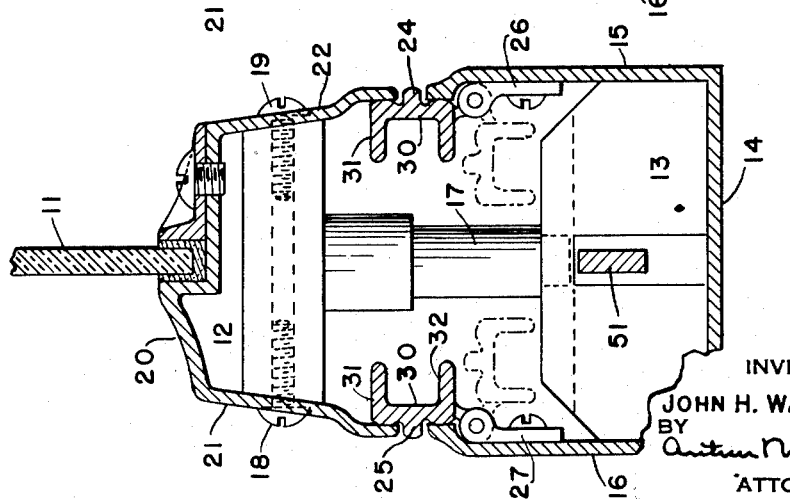

After the vent-section is then ready for closing, it is rotated about its axis until the free edges of its channel sections are aligned in abutment with the edges of the channel sections of the fixed frame. Then the operator turns his key 47 in its socket 46 starting with the separable fastener means as shown in Figs. 6 and 9, with the sequential results that the pin 44 on arm 43 of quadrant (and similar pins, arms and quadrants in the other corners of the frame because they are all linked together by links 51 to act in unison) rises from Fig. 9ᵇ (and Fig. 6) position to engage flange 30 (or its extension 30ᵃ) of leaf members 24 and 25 to swing them upwardly until they assume junction-bridging position of Fig. 8ᵇ. Meanwhile, due to the predetermined timing, link 51 has moved from Fig. 6 position to Fig. 5 position with the latching bell-cranks 53 (and 54) going to the positions shown therein but not yet in leaf-member sealing position. Continued clockwise turning of the quadrant arm 43 causes the pin 44 to rise to Fig. 7ᶜ position, and the bell-cranks to rise to Fig. 7ᵇ position in wedging (and thus locking or latching) contact with the ribbed blocks 58 fastened at intervals between the flanges of the leaf members.

Thus it can be seen that I have devised an extrudable metal window, preferably of aluminum, with a completely rotatable vent-section and a separable fastening means between the vent-section and fixed window frame, that is highly effective in solving the various problems presented in the device and operation of such a window.

I claim:

1. A window structure having a channel-shaped fixed frame and a channel-shaped glazed sash rotatably mounted within the fixed frame with the free ends of the latter abutting and aligned with the free edges of the frame when the glazed sash is in window-closing position, characterized by linear leaf members hingedly supported from the interior of the frame retractably swingable to extend outwardly therebeyond to bridge the junction between the abutting free edges of the frame and of the sash, means for alternately swinging the leaf members into and out of junction-bridging position, and turnable latching means operable in one direction when the leaf members are in bridging position to force them outwardly into junction-sealing position and operable in another direction to unseal the leaf members while leaving them substantially in bridging position.

2. Apparatus according to claim 1, with the addition of connector means extending between the means for swinging the leaf members and the latching means whose operation in one direction sequentially swings the leaf members into bridging position followed by forcing them into sealing position and whose operation in the other direction sequentially unseals the leaf members to leave them in bridging position followed by withdrawing them into sash opening position.

3. Apparatus according to claim 1, with the addition of connector means extending between the means for swinging the leaf members and the latching means whose operation of the latter in one direction sequentially swings the leaf members into bridging position followed by forcing them into sealing position and whose operation in the other direction sequentially unseals the leaf members to leave them in bridging position followed by withdrawing them in sash opening position, and key means insertable into the window frame by the rotation of which key the latching means are actuated.

4. A window structure having a channel-shaped fixed frame and a channel-shaped glazed sash rotatably mounted within the fixed frame with the free ends of the latter abutting and aligned with the free edges of the frame when the glazed sash is in window-closing position, characterized by linear leaf members hingedly supported from the interior of the frame retractably swingable to extend outwardly therebeyond to bridge the junction between the abutting free edges of the frame and of the sash, means for alternately swinging the leaf members into and out of junction-bridging position, and turnable latching means operable in one direction when the leaf members are in bridging position to force them outwardly into junction-sealing position and operable in another direction to unseal the leaf members while leaving them substantially in bridging position with the addition that the leaf members are channel-shaped in cross-section and set therein are blocks, presenting a wedging rib for engagement by the latching means.

5. The combination with a window structure having a channel-shaped fixed frame and a channel-shaped glazed sash rotatably mounted within the frame with the free edges of the sash aligned with the free edges of the frame when the glazed sash is in window-closing position whereby each free inner edge of the frame has associated therewith a corresponding free outer edge of the sash, each pair of associated edges constituting a bridgeable gap, a linear leaf member for bridging and sealing each gap hingedly supported from the interior of the frame to be swingable into and out of gap-bridging position, each leaf member thus having opposite thereto a leaf member symmetrically associated therewith to constitute a pair, actuating means for alternately swinging the leaf members into and out of gap-bridging position, and latching means for each pair of leaf members mounted in the frame and swingable in one direction to engage the leaf members for exerting outwardly directed gap-sealing pressure upon each of the leaf members when in bridging position while being swingable in the opposite direction for relieving the sealing pressure.

6. Apparatus according to claim 5, in which said latching means comprise a pair of resilient parallel arms having fixed relationship with one another but spaced apart such a distance and having such a degree of springiness as to allow them to yield resiliently towards one another when swung into gap-sealing position.

7. Apparatus according to claim 5, in which the actuating means for swinging the leaf members comprise an angular portion provided at one end of each leaf member having a pair of wing portions extending substantially at right angles to one another and presenting a pair of inner cam faces engageable in alternation for swinging such leaf member outwardly and inwardly respectively, an actuating arm mounted in the frame and swingable in the plane thereof, and a pair of fingers carried by the arm extending laterally thereof in opposite directions with each finger lodgeable in a respective angular portion and adapted to engage the cam faces thereof so that movement of the actuating arm in respective directions is adapted to swing the associated leaf members into and out of bridging position by the fingers engaging respective cam faces.

8. The combination with a window structure having a channel-shaped fixed frame and a channel-shaped glazed sash rotatably mounted within the frame with the free edges of the sash aligned with the free edges of the frame when the sash is in window-closing position whereby each free inner edge of the frame has associated therewith a corresponding free outer edge of the vent-section with each such pair of associated edges constituting a bridgeable gap, a linear leaf member for bridging and sealing each gap hingedly supported from the interior of the frame so as to be swingable into and out of gap-bridging position, each leaf member thus having opposite thereto a leaf member symmetrically associated therewith to constitute a pair of actuating means for swinging the leaf members comprising an angular portion provided at one end of each leaf member each having a pair of wing portions extending substantially at right angles to one another and presenting a pair of inner cam faces engageable in alternation for swinging the leaf member outwardly and inwardly respectively, an actuating arm mounted in the frame and swingable in the plane thereof, and a pair of fingers carried by the arm extending laterally thereof in opposite directions and lodgeable in a respective angular portion and adapted to engage the cam faces thereof so that movement of the actuating arm in respective directions is adapted to swing the associated leaf members into and out of bridging position by the fingers engaging respective cam faces, latching means for each pair of leaf members mounted in the frame and swingable to engaged position in one direction to engage the leaf members for exerting outwardly directed gap-sealing pressure upon each of the leaf members when in bridging position, and swingable in the opposite direction to non-engaged position for relieving the sealing pressure, and an interconnecting link between the latching means and the actuating arm, whereby swinging of the arm will turn the latching means, dimensioned to provide sufficient lost swinging motion in the arm prior to its reaching cam face engaging position whereby the fingers engage a respective pair of cam faces after the link has turned the latching means to the non-engaged position and vice versa when the latching means move into engaged position while the arm performs lost motion away from the cam faces.

9. A window structure including a fixed frame and a sash rotatably mounted within the fixed frame with its free ends aligned with and contiguous to the free edges of the fixed frame when the sash is in window-closing position, linear leaf members hingedly supported on the fixed frame inwardly of the free edges thereof retractably swingable to extend outwardly therebeyond to bridge the free edges of the frame and sash, means for alternately swinging the leaf members into and out of edge-bridging position, and turnable latching means operable in one direction when the leaf members are in bridging position to force them outwardly into edge-sealing position and operable in another direction to unseal the leaf members while leaving them substantially in bridging position.

10. A window structure according to claim 9, with the addition of connector means extending between the means for swinging the leaf members and the latching means whose operation in one direction sequentially swings the leaf members into bridging position followed by forcing them into sealing position and whose operation in the other direction sequentially unseals the leaf members to leave them in bridging position followed by withdrawing them into sash-opening position.

11. A window structure according to claim 9 in which said latching means consists of arms pivoted to swing in a vertical plane and having laterally resilient leaf-engaging free end portions.

References Cited in the file of this patent

FOREIGN PATENTS

| 145,096 | Austria | Mar. 25, 1936 |
| 102,679 | Sweden | Sept. 30, 1941 |